Jan. 16, 1962 T. R. LA VALLEE 3,017,527
MULTIPLE DRIVE CONTROL SYSTEM
Filed May 2, 1958 5 Sheets-Sheet 1

INVENTOR.
THEODORE R. LaVALLEE
BY
Bates, Teare & McBean
ATTORNEYS

INVENTOR.
THEODORE R. LaVALLEE
BY
Bates, Teare & McBean
ATTORNEYS

INVENTOR.
THEODORE R. LaVALLEE
BY
Bates, Teare & McBean
ATTORNEYS

United States Patent Office 3,017,527
Patented Jan. 16, 1962

3,017,527
MULTIPLE DRIVE CONTROL SYSTEM
Theodore R. La Vallee, Ferndale, Mich., assignor to Eaton Manufacturing Company, Cleveland, Ohio, a corporation of Ohio
Filed May 2, 1958, Ser. No. 732,744
11 Claims. (Cl. 310—94)

This invention relates in general to multiple drive systems and more particularly relates to an improved arrangement for controlling a multiple drive system to maintain a predetermined speed for a variable common load.

While this invention contemplates the application of its principles to any variable load having a multiple drive, the following description will, for exemplary purposes, be confined to the operation of a multiple drive conveyor. A common form of multiple drive for conveyors utilizes several variable speed drive units drivingly coupled at optimum drive locations in the conveyor path. A conventional variable speed drive employs a driving member in the form of an alternating current squirrel cage motor and a driven member adapted to be drivingly coupled to the conveyor load. The driving and driven members are electrically coupled for the transmission of driving torque by means of an electrical slip clutch having an eddy current coupling, and the component parts may be assembled into an integral, self contained unit.

In the exemplary environment of a conveyor drive, variations in load may be reflected as variations in speed at the driven member for a given excitation of the corresponding electrical slip clutch. The variations in speed are normally converted by a tachometer generator into a variable control potential which ordinarily modulates a unidirectional current applied to the field coil of the clutch in a manner to compensate for the variation in speed caused by the changed load condition, thereby to maintain a predetermined speed at the load.

Heretofore, in multiple drive conveyors systems, each drive has been individually controlled by separate excitation sources in the foregoing manner. While it may be possible to adjust the separate excitation sources to initially accommodate the characteristics of the individual drives, the sensitivity of the system renders it difficult to avoid undesirable interaction during operation. Thus, close load sharing and stability have been recurring problems in conventional drive conveyor systems as hereinbefore described.

Accordingly, it is a principal object of this invention to improve the stability and load sharing characteristics of such a multiple drive system.

Another object of this invention relates to the simplification of control of such a multiple drive system and the consequent improvement in its performance.

Still another object of this invention relates to a reduction in the component parts of such a multiple drive control system to provide a simplified and more economical drive.

Briefly, the foregoing and other objectives and advantages are accomplished in accordance with this invention by providing a multiple drive for a variable common load, such as a conveyor, which utilizes a preselected one of the drives as a master wherein excitation of its electrical slip clutch is controlled in response to speed variations in the load, while the electrical slip clutches of the other drives act as slaves in that they respond to load variations with corresponding variations in their driving speed which are reflected through the load to the tachometer generator of the master and, thence to the exciting coils of all of the slip clutches in a manner to return each of the drives to the predetermined load speed.

Figure 1:
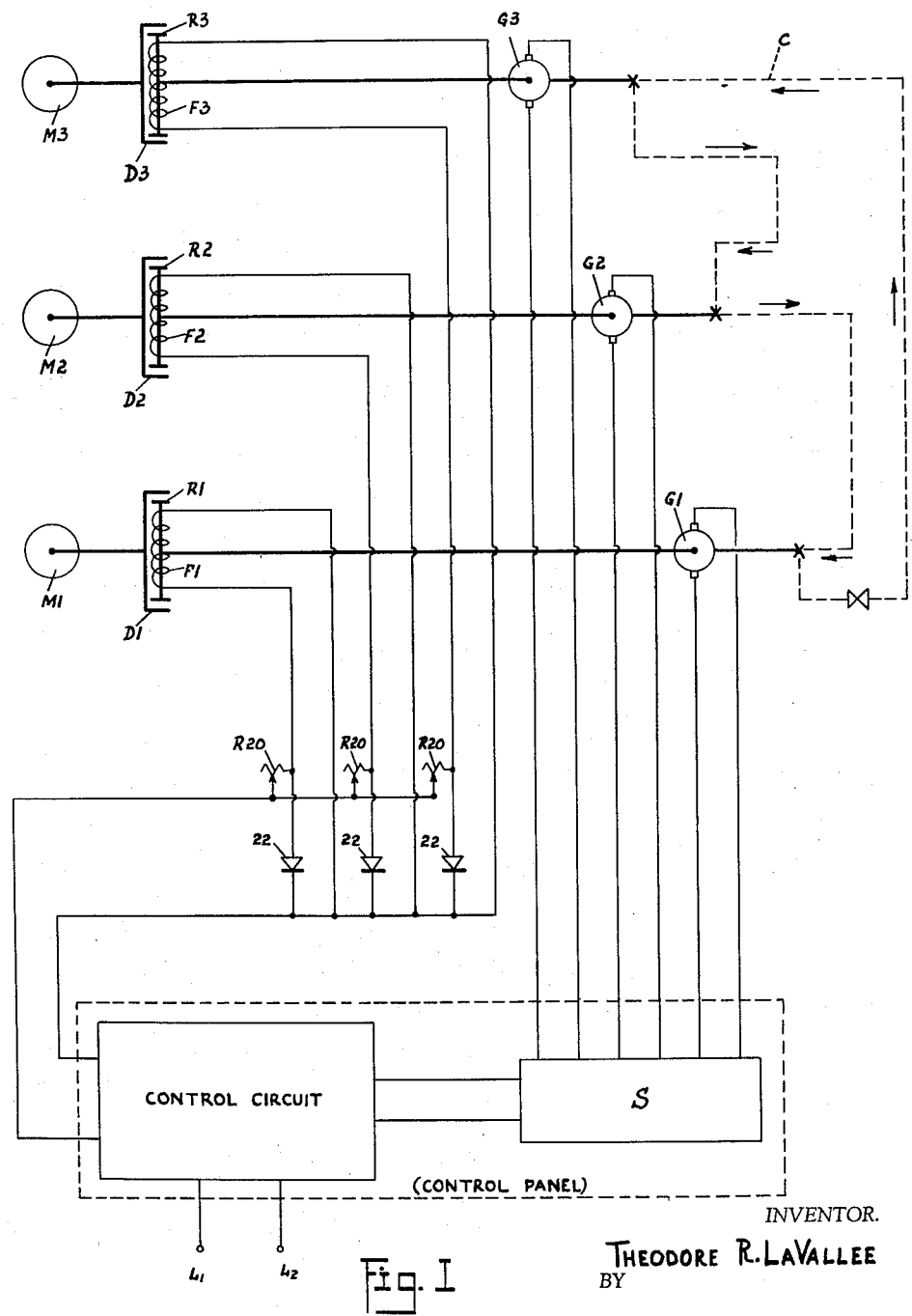
FIG. 1 is a combined schematic and diagrammatic illustration of a multiple drive conveyor system employing the principles of this invention.

Referring now to FIG. 1 of the drawings, there is shown a multiple drive system for a conveyor chain C which is diagrammatically represented by the dotted lines for movement in the direction and path shown by the arrows. Each drive is diagrammatically illustrated as including a conventional alternating squirrel cage motor M1, 2 or 3, each having a drum D1, 2 or 3 on its input shaft adapted for eddy current coupling in a conventional manner with a rotor or field member R1, 2, or 3. A conventional tachometer generator G1, 2 or 3 is shown coupled to each output shaft and each output shaft is in turn adapted to be drivingly coupled to a preselected point in the conveyor path. The latter may be accomplished through conventional worm gears and ratchet drive. For the purpose of the following description, the drums D1, 2 or 3 and their associated motor drives are considered as the driving member of the drive unit, while the field members R1, 2 or 3, together with their associated tachometer generators G1, 2 or 3 and coupling to the conveyor load, are considered as the driven members of the drive unit. The field member of each driven member has an exciting field coil F1, 2 or 3, which is adapted to be excited by direct current to provide the necessary magnetic field which coacts in a well known manner with an induced eddy current field in the corresponding drums D1, 2 or 3 to transmit driving torque from the driving member to the driven member. The excitation applied to field coils F1, 2 or 3 establishes the strength of the magnetic field and consequently determines the amount of torque transmitted at any definite rate of slip between the two rotating members. Since the voltage generated by each tachometer generator is proportional to the speed of the corresponding driven member, it is readily apparent that its output can be utilized to control the speed of the driven member.

Figure 2:
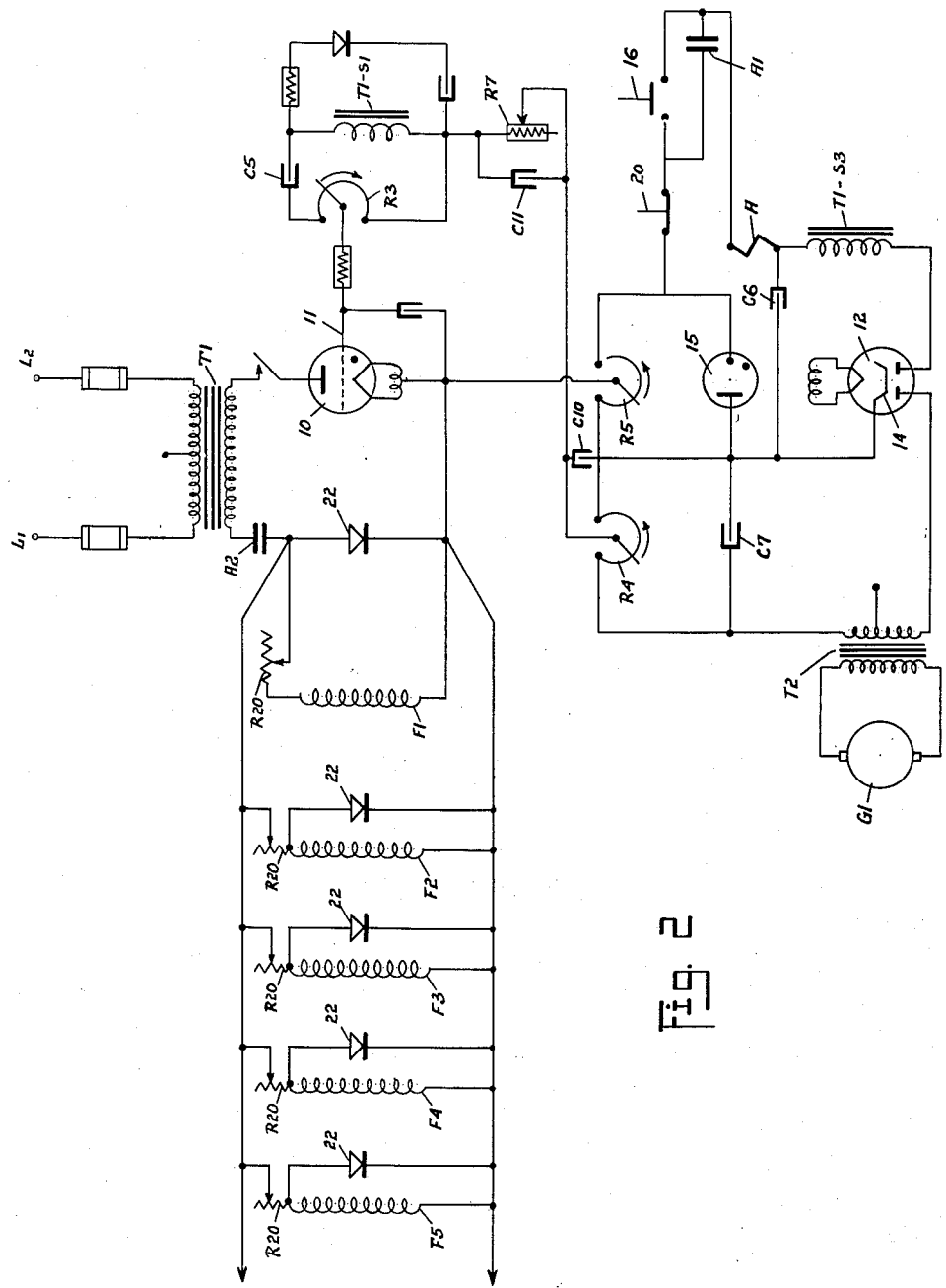
FIG. 2 is a schematic illustration of one embodiment of a circuit for controlling the multiple drive system in accordance with this invention.

Referring now more particularly to FIG. 2 of the drawings and specifically to that portion of the system contained within the dotted lines in FIG. 1, there is shown one preferred embodiment of a circuit for utilizing the tachometer output to control the excitation of the field coil of a driven member. The controlling member is a gas-filled thyratron 10 which regulates the current in the power circuit in accordance with the potential applied to its grid 11 in a well-known manner. The potential at the grid 11 is in turn controlled by the associated speed governing portion of the circuit which supplies a so-called rider wave potential, a governed potential, and a reference potential to the grid at any given instant. Speed selection and speed maintenance are functions of these potentials at the thyratron grid.

The rider wave potential is provided by a transformer secondary winding T1—S1 and a condenser C5 shifts this potential wave out of place with the anode voltage. The potentiometer R3 adjusts the control regulation or sensitivity of response to load changes.

The governed potential is produced by the tachometer generator G1 and varies directly with the speed of the driven member. This voltage is stepped up by the transformer T2 and rectified by a conventional rectifier 12. A condenser C7 filters the half-wave rectified output to provide a relatively smooth direct current beyond that point. The resultant governed potential may be adjusted by a potentiometer R4 which determines the maximum speed of the drive. The potential from this portion of the circuit to the grid 11 is always a negative value.

The reference potential provides a positive voltage in the thyratron grid circuit which can be adjusted by the potentiometer R5 to set the speed at which the drive is to operate. This portion of the circuit is independent from the governed portion of the circuit and is energized by the transformer secondary winding T1—S3. The cathode 14 of the rectifier 12 is common to both portions of the circuit and rectifier 12 serves the dual function of rectifying the alternating current in both portions of the circuit. The condenser C6 operates to release energy to the circuit in the off-cycle to provide a smooth continuous flow of direct current beyond that point. A gas-filled voltage regulator 15 is also provided to isolate the circuit from line voltage fluctuations and operates to maintain a relatively constant voltage across the speed setting potentiometer R5. The remainder of this portion of the control circuit provides a manual control such that by depressing the run button 16, the relay coil A is energized and closes its contacts A–1 and A–2. Closing of the A–1 contact provides a holding circuit for the relay coil 18 which maintains the A–2 contact in the anode circuit closed until the stop button 20 is depressed.

Thus, by adjusting R5 it is possible to set the predetermined speed at which the drive unit to which the control circuit is applied will operate. The sensitivity to load changes is controlled by R3, and the maximum and minimum speed adjustments are controlled by R4 and R7. When the various potentiometers are set for a predetermined speed and sensitivity, variations in the tachometer generator output due to variations in the speed of the driven member of the drive unit will be reflected in the control circuit to control the firing of the thyratron and thereby to control the direct current supplied to the field coil of the electrical slip clutch.

As hereinbefore indicated in the introduction, each individual drive unit of a multiple drive system may be separately excited by a control circuit in the foregoing manner. Such control, however, results in an inability to maintain the adjusted characteristics of the individual drives during operation with the consequent undesirable interaction between the drives and with the recurring problems of poor stability and load sharing. These problems are overcome in accordance with this invention by exciting the field coil of only one of the drive units in this manner, the remaining field coils being coupled as slaves for excitation by the same control potential.

Thus, as shown in FIGS. 1 and 2, the field coils F2, 3, 4 and 5 of additional drive units may be connected in parallel with a master field coil F1. Then the preselected master drive unit remains the master at all times, since the only speed intelligence to the control circuit is derived from the tachometer generator G1 on the output shaft of the master drive unit. Accordingly, all of the drive units function and govern to the preset speed of the single potentiometer R5 to achieve the desired speed control. While the slave units obtain their excitation from the same source as the master drive unit, neither of the slave units can govern. The operation of the additional slave units is positively limited to that of functioning as high-slip torque drives assisting the master drive unit. On a light load, the slave units will attempt to increase in speed with the lower torque required. As the loading increases, the slave units will increase in slip, thereby developing additional torque to overcome the increase in load. However, as quickly as any speed change due to load change, localized friction, mechanical interference, or any other reason is reflected on the master unit tachometer G1, the thyratron 10 in the master unit control circuit will control the excitation of all the drive units until the preset speed condition is returned. This insures that under any and all conditions of operation the master drive units will maintain the preset speed and the slaves will assist the master, but that under no circumstances will the slave units overcome the speed set by the master drive unit. This is an ideal situation on any multiple conveyor drive system and permits the use of a single mechanical takeup of slack chain which should preferably be located immediately after the master drive unit.

Referring again to the circuit of FIG. 2, each of the clutch field coils F1 to F5 has a rectifier 22 connected across the coil for protection against inductive voltages. Each field coil is also connected to the control circuit through adjustable ballast resistors, R20, which permit independent initial adjustment for the particular characteristics of the conveyor load and corresponding drive unit. In addition, as schematically shown in FIG. 1, the tachometer generators may also be connected to a selector switch shown diagrammatically at S as being located on the control panel to provide a convenient check on the speed of each of the drive units. The selector switch S also permits shifting of the control circuit to different ones of the drive unit field coils, thereby permitting any one of the drive units to be employed as the master with a minimum delay in the event that the existing master becomes inoperative.

Figure 3:
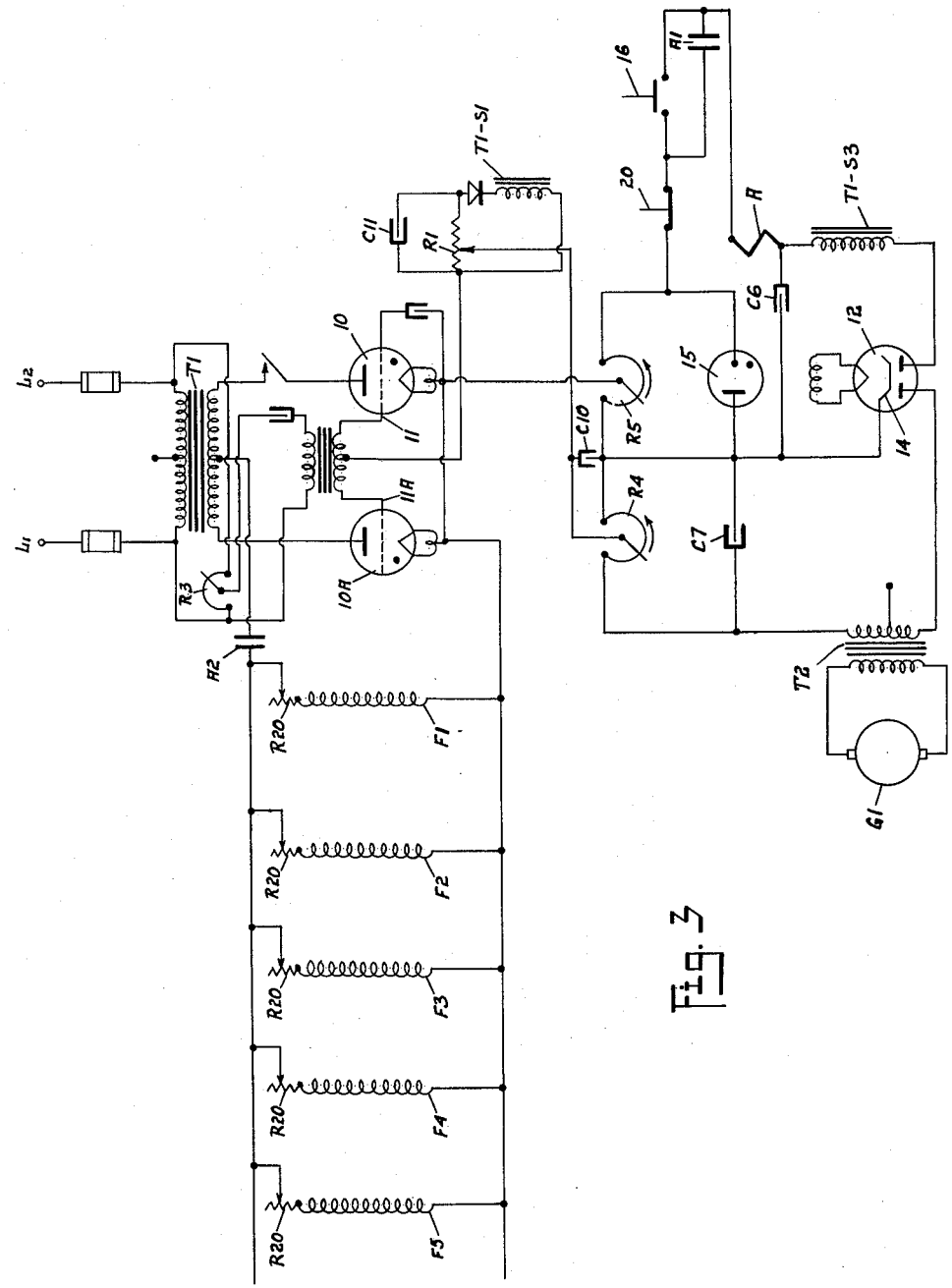
FIGS. 3 and 4 are schematic illustrations of other circuit embodiments for controlling the multiple drive system in accordance with this invention.
Figure 4:
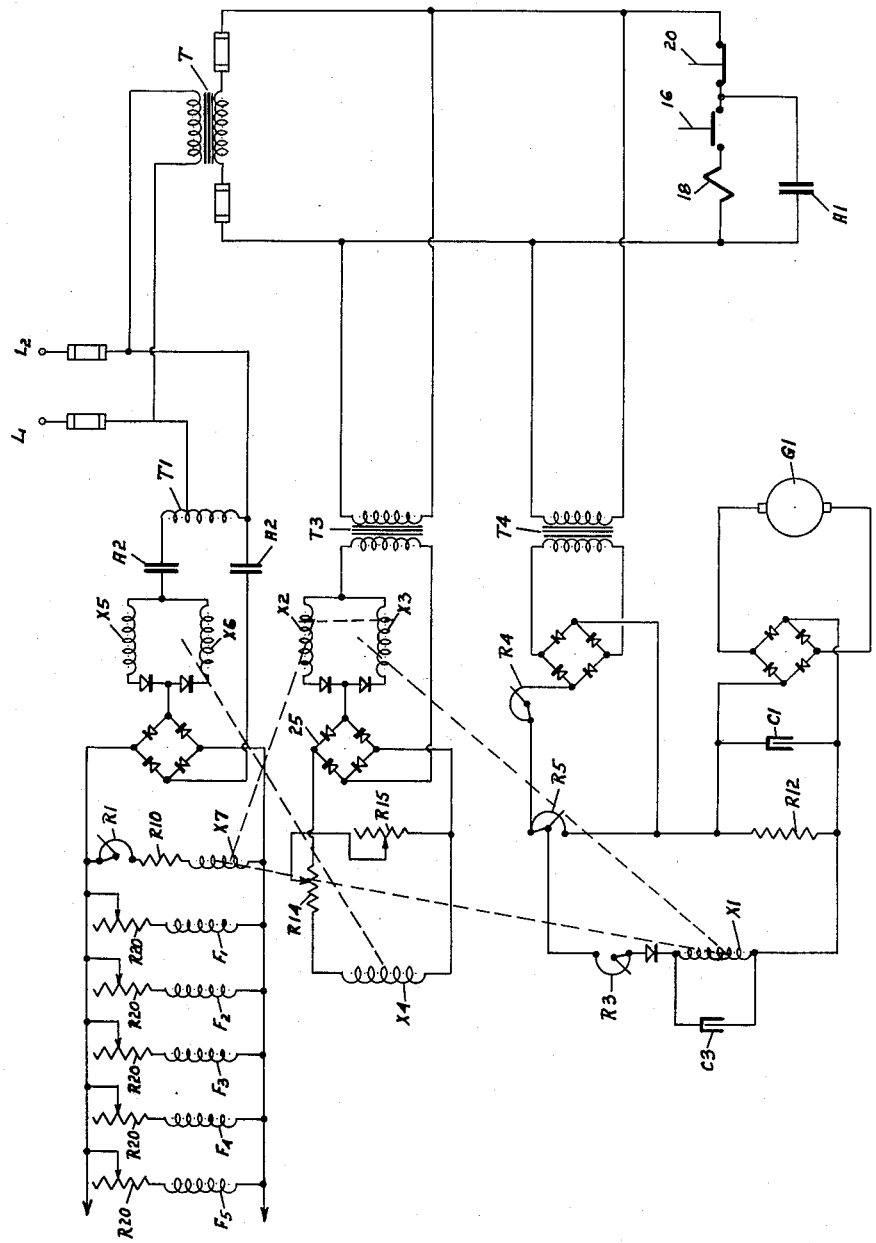

Referring now to FIGS. 3 and 4 of the drawings there is shown respectively an equivalent control circuit employing a full-wave rectified output in FIG. 3 and a control circuit employing magnetic amplifiers to perform substantially the same control functions in FIG. 4. In the control circuit of FIG. 3, the second thyratron is designated 10A and the sensitivity control potentiometer R3 is shown connected across the primary of a transformer T3, the secondary of which is coupled to the thyratron grids. In the control circuit of FIG. 4, the governed and reference potentials are combined and applied to the field coils through conventional magnetic amplifiers. Thus, the rectified governing and reference potentials are applied through the speed adjusting potentiometers R4 and R5 to the control coil X1 which controls the saturation of the core (not shown) on which the coils X2 and X3 are wound. This amplified control signal is rectified at 25 and applied through adjusting rheostats R14 and R15 to the control coil X4 for controlled modification of the energizing potential supplied to the clutch field coils through the magnetic amplifier coils X5 and X6 (core not shown). The coil X7 is a feedback coupled to the magnetic amplifier represented by the coils X1, 2 and 3 and operates in a well-known manner to increase the gain. A regulation control is provided in the series potentiometer R1.

The controlled drive unit will control the speed of the load closely despite variations in the load in precisely the same fashion as would a single drive for any selected position of the speed setting potentiometer R5. By paralleling the drive units in the manner shown, each is positively fed the same control voltage and current as the field coil F1 of the master drive unit. Accordingly, the system is extremely stable and the slaves cannot escape functioning as such since they cannot change the excitation supplied to them. Each of the slave units change speed along the excitation curve selected by the voltage of the tachometer generator G1 and the setting of the R5 potentiometer. Any increase in load will cause the slave drive units to increase in slip, thereby developing more torque to handle the increase in load. Since any part on the conveyor chain passes through slave drive units before arriving at the master, the decrease in chain speed immediately changes the speed of the tachometer generator G1 which in turn increases the excitation supplied to all of the drive units. Conversely, a light load permits these slave drive units to increase in speed, thus increasing the conveyor speed and the speed of the tachometer generator G1 in the master drive unit which in turn reduces the excitation supplied by the thyratron tube to all of the drive units. Thus, the control circuit constantly readjusts automatically to maintain the preset speed of the conveyor. The slave drive units at all times furnish the required torque irrespective of the degree of speed change required to maintain preset conveyor speed. Within the power capacity of the drive units, the set conveyor speed is maintained irrespective of the condition of the load.

Figure 5:
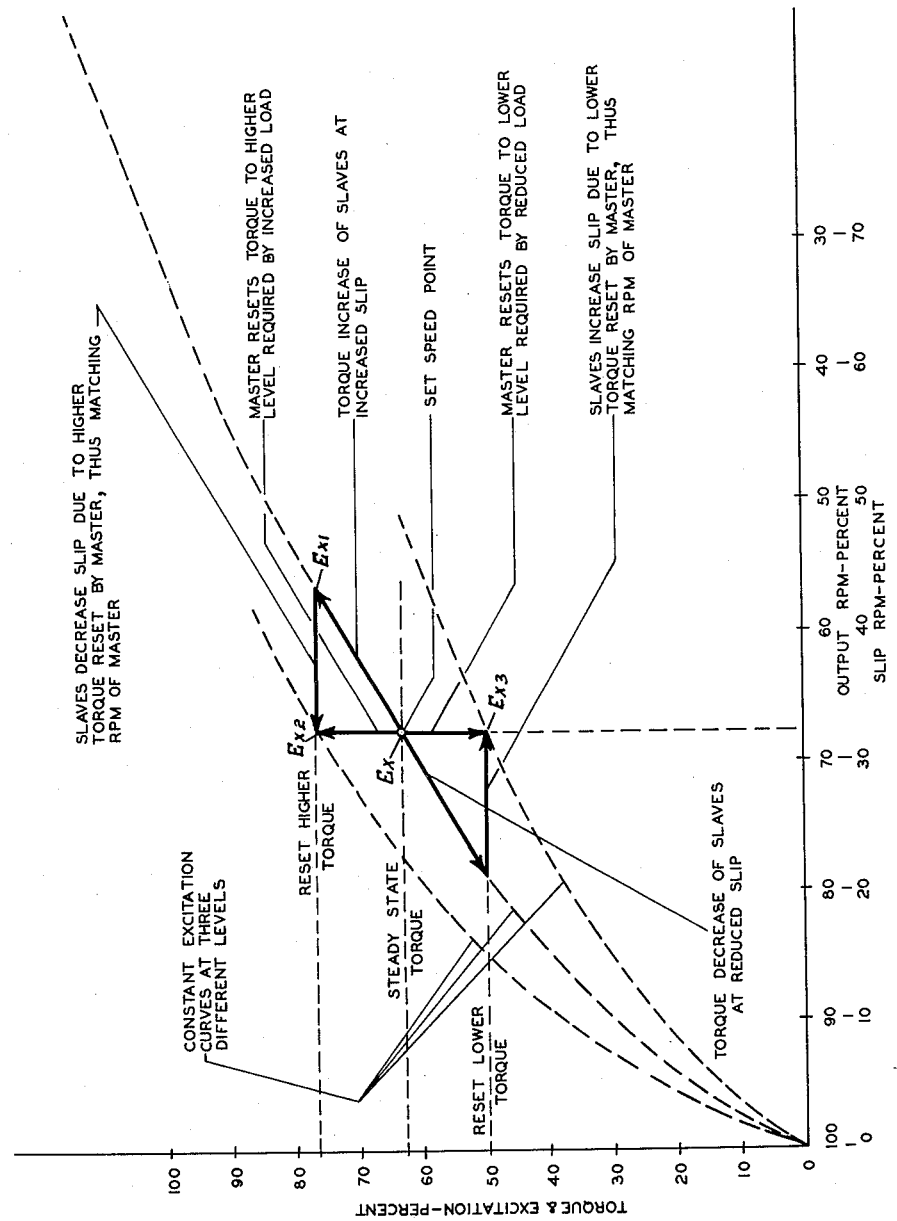
FIG. 5 is a graphical representation of the controlled operation of the multiple drive system in accordance with this invention.

Referring now to FIG. 5 of the drawings, the operation of the single control multiple drive system is graphically illustrated. The dotted line curves indicate different excitation levels for the field coils of the drive units. The control point Ex is an arbitrary set speed for the conveyor load at a preset operating level determined by the indicated excitation curve. The slope of the excitation curve varies depending on the exact position of the selected set speed point. Although the slope of the excitation curve changes depending on the set speed point and load, there is some slope maintained at all such points due to the rising characteristics of all torque curves with increased slip.

Thus, as shown in FIG. 5, an increase in the load on the slave drive units moves the slip point from the set speed point Ex along the excitation curve towards an upper right position Ex1 on the curve. At fixed excitation the slave drive units can transmit increased torque only by a decrease in their speed. Irrespective of the degree of shift of the slave drive units in this direction, the speed change is reflected to the master drive unit which readjusts the firing of the control thyratron 10 through the generator and control circuit to a higher level of excitation Ex2. Since more excitation is now applied to the slave drive units, they will follow the return path (upper arrow) to the new higher excitation level Ex2 set by the master drive unit and all drives operate at the same speed. If conversely there is a decrease in the load on the slave drive units, they increase in speed along the same excitation curve and the speed of the tachometer generator G1 on the master drive unit also increases, thereby reducing the firing of the thyratron 10 to a lower level of excitation Ex3. With less excitation supplied for the new condition, the slave drive units will follow the return path (lower arrow) to the new lower torque level and return to the set speed of the master drive unit.

The operation of the conveyor C by a master and multiple slave drive unit hereinbefore described positively prevents the slave drive units from transmitting as much power as the master drive unit under any condition of operation. This is believed to be the ultimate in control for multiple drive conveyors and insures uniform distribution of the load between the multiple drive units at all times.

As previously noted, a conventional ratchet drive is preferably provided on the output shaft of the worm gear of each drive unit. In the event that the preselected master drive unit becomes inoperative, it is possible to change the position of the selector switch and thereby operate one of the slave drive units as the master by impressing the voltage of the corresponding slave tachometer generator on the control circuit. It being understood, of course, that the field coil of the inoperative clutch will be disconnected from the control circuit. The ratchet drive permits pull-through of the conveyor chain without damaging the inoperative drive unit. Since most multiple drive conveyor systems have surplus power, the remaining drive units could continue to drive the conveyor at the original set speed.

Thus, there has been provided in accordance with this invention, a multiple drive control system which has improved stability and load sharing characteristics. Single speed control is assured regardless of the number of drive units employed. It also guarantees continued operation with a minimum of delay in the event that any one of the preselected master units becomes inoperative. It is also possible to check the rotational speed of any of the drive units at the selector switch of the tachometer generators, and mechanical protection can be afforded to all of the drive units by providing ratchet drives. A minimum of maintenance is assured because of the simplicity of the control and the reduction of component parts in the control system effect economies in cost and space, all of which provide improved performance and more efficient operation.

While I have shown and described what I consider to be the preferred embodiments of my invention, it will be obvious to those skilled in the art that other changes and modifications may be made without departing from the scope of my invention as defined by the appended claims.

I claim:

1. In a multiple drive system for a variable load the combination comprising, a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing field coil, means for energizing each of said field coils to drive the driven members at a predetermined speed at the load, and common means for varying the energization of each of said field coils in response to variations in the speed of a selected one of said driven members to maintain the predetermined speed for all of the driven members at the load.

2. In a multiple drive system for a variable load the combination comprising, a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing field coil, common means for variably energizing said field coils, and means operative in response to variations in the speed of at least one of the driven members to vary said common energizing means in a manner to compensate for the variations in speed.

3. The multiple drive system of claim 2 wherein said field coil energizing means includes means for adjusting the excitation of each of said field coils independently of speed responsive control means.

4. In a multiple drive system for a variable load the combination comprising, a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing field coil, means for energizing at least one of said field coils as a master, other means for translating the speed of the driven member corresponding to said at least one of said field coils into a corresponding electrical control signal, means responsive to said control signal for varying said energizing means in a manner to compensate for variations in speed of said master driven member, and means coupling the other of said field coils as slaves to the controlled output of said energizing means, thereby to maintain a predetermined speed for all of said driven members at the load.

5. In a multiple drive system for a variable load the combination comprising, a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing field coil, means for exciting each of said field coils to drive the driven members at a predetermined speed at the load, electro-responsive means for varying the excitation of each of said field coils, means for translating the speed of at least one of said driven members into a corresponding electrical control signal, and other means for applying the control signal to said electro-responsive means to vary the excitation of the field coils in a manner to compensate for variations in the speed of said at least one of said driven members, thereby to maintain the predetermined speed for all of the driven members at the load.

6. In a multiple drive system for a variable load, the combination comprising a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing member, means for supplying a predetermined excitation to each of said energizing members, means operative in response to variations in the speed of a selected one of said driven members to modify said predetermined excitation in a manner to compensate for said variations in speed.

7. In a multiple drive system for a variable load the combination comprising, a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing field member, means for supplying a predetermined excitation to each of said field members, a plurality of means for independently translating the speed of a corresponding driven member into an electrical signal, means for modifying said predetermined excitation of the field members in accordance with a selected one of said electrical signals, and in a manner to compensate for variations in speed of the corresponding driven member, and other means for selectively applying one of said electrical signals to said excitation modifying means.

8. In a multiple drive system having a plurality of driving members each being electrically coupled to transmit their driving torque to a plurality of driven members respectively and each driven member being independently coupled in driving relation to a variable common load, a control system therefor comprising, means for supplying a predetermined excitation to the electrical coupling between each of the driving and driven members and means operative in response to variations in the speed of a selected one of said driven members to modify said predetermined excitation in a manner to compensate for said variations in speed.

9. The control system of claim 8 wherein said excitation modifying means includes means for selectively adjusting the level of said predetermined excitation and other means for translating the speed of said one of said driven members into a signal for controlling the modification of said predetermined excitation.

10. In a multiple drive system for a variable load the combination comprising, a plurality of driving and driven members, means for independently coupling each of said driven members in driving relation to said variable load, an independent electro-responsive coupling coacting to transmit driving torque from each driving member to a corresponding driven member respectively, means for exciting each of said electro-responsive couplings to drive the driven members at a predetermined speed at the load, and means operative in response to variations in the speed of a selected one of said driven members to vary the excitation of each of said electro-responsive couplings to maintain the predetermined speed for all of the driven members at the load.

11. In a multiple drive system for a variable load the combination comprising, a plurality of driving and driven members, means for independently coupling each of said driven members in driving relation to said variable load, a plurality of electrical slip clutches respectively coacting to independently transmit the driving torque from each driving member to a corresponding one of said driven members and each having an energizing field coil, adjustable means for selectively supplying a predetermined excitation to each of said field coils, means operative in response to variations in the speed of a selected one of said driven members to modify any selected predetermined excitation in a manner to compensate for said variations in speed, and adjustable means for limiting the modifying effect of said speed responsive means to limit the maximum speed of each of said driven members.

References Cited in the file of this patent
UNITED STATES PATENTS

| 2,254,886 | Cook | Sept. 2, 1941 |

FOREIGN PATENTS

| 514,481 | Canada | July 12, 1955 |
| 568,730 | Great Britain | Apr. 18, 1945 |
| 610,281 | Great Britain | Oct. 13, 1948 |